(12) United States Patent
Wysocki

(10) Patent No.: US 8,608,193 B1
(45) Date of Patent: Dec. 17, 2013

(54) INFLATABLE SIDE CURTAIN

(71) Applicant: TRW Vehicle Safety Systems Inc., Washington, MI (US)

(72) Inventor: Greg A. Wysocki, Macomb, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 13/794,911

(22) Filed: Mar. 12, 2013

(51) Int. Cl.
*B60R 21/16* (2006.01)

(52) U.S. Cl.
USPC ........................................ 280/730.2

(58) Field of Classification Search
USPC ............................. 280/730.2, 736
See application file for complete search history.

(56) References Cited

U.S. PATENT DOCUMENTS

| | | | |
|---|---|---|---|
| 6,042,141 A | 3/2000 | Welch et al. | |
| 6,431,590 B1 | 8/2002 | Bakhsh et al. | |
| 6,527,296 B2 | 3/2003 | Bakhsh et al. | |
| 2005/0189743 A1 | 9/2005 | Bakhsh et al. | |
| 2007/0138778 A1* | 6/2007 | Takemura et al. | 280/743.1 |
| 2012/0313356 A1* | 12/2012 | Saimura et al. | 280/730.2 |

* cited by examiner

*Primary Examiner* — Faye M. Fleming
(74) *Attorney, Agent, or Firm* — Tarolli, Sundheim, Covell & Tummino LLP

(57) ABSTRACT

An apparatus (10) for helping to protect an occupant of a vehicle (12) that has a side structure (16) and a roof (18) includes an inflatable vehicle occupant protection device (14) inflatable away from the vehicle roof (18) into a position between the side structure (16) of the vehicle (12) and a vehicle occupant. The protection device (14) includes an inflatable main portion (62) having at least one inflatable primary chamber (110) and an inflatable secondary chamber (112). An inflation fluid source (30) is actuatable to provide inflation fluid for inflating the protection device (14). The inflation fluid source (30) when actuated directs inflation fluid into the main portion (62) to inflate the main portion (62). Inflation fluid inlets (152) of the primary chambers (110) direct inflation fluid from the inflation fluid source (30) into the primary chambers (110). Inflation fluid outlets (154, 156) of the primary chambers (110) direct inflation fluid from the primary chambers (110) into the secondary chamber (112) to inflate the secondary chamber (112).

18 Claims, 7 Drawing Sheets

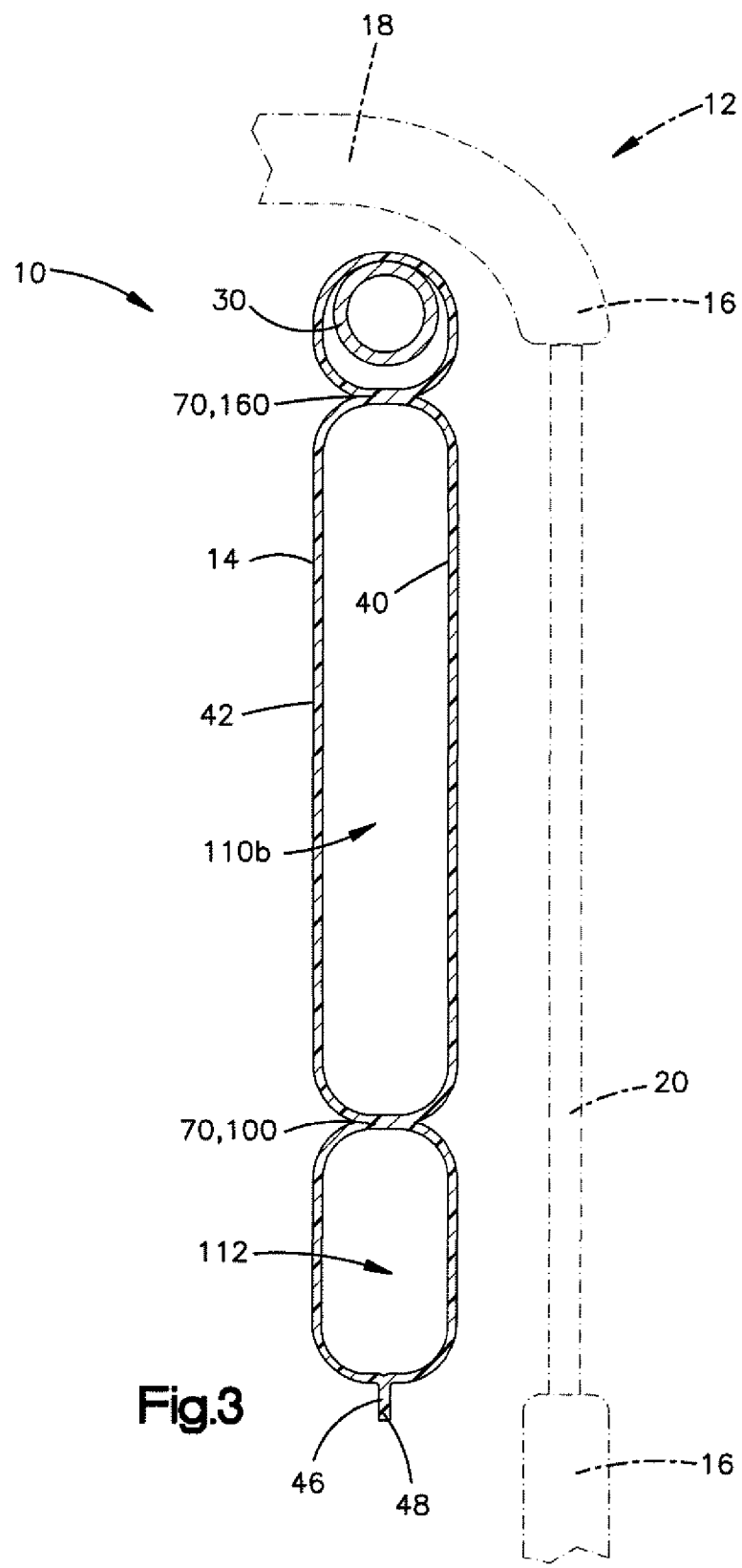

INFLATABLE SIDE CURTAIN

FIELD OF THE INVENTION

The present invention relates to an apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment in the event of a side impact or a vehicle rollover. The inflatable curtain, when inflated, is positioned between a vehicle occupant and the side structure of the vehicle. A known inflatable curtain is inflated by inflation fluid directed from an inflator to the inflatable curtain through a fill tube.

SUMMARY OF THE INVENTION

The present invention relates to apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. The inflatable vehicle occupant protection device includes an inflatable main portion having at least one inflatable primary chamber and an inflatable secondary chamber. Each primary chamber has an inflation fluid inlet and a plurality of inflation fluid outlets. An inflation fluid source is actuatable to provide inflation fluid for inflating the inflatable vehicle occupant protection device. The inflation fluid source when actuated directs inflation fluid into the main portion to inflate the main portion. The inflation fluid inlets of the primary chambers direct inflation fluid from the inflation fluid source into the primary chambers. The inflation fluid outlets of the primary chambers direct inflation fluid from the primary chambers into the secondary chamber to inflate the secondary chamber.

In another aspect of the present invention an apparatus for helping to protect an occupant of a vehicle that has a side structure and a roof and includes an inflatable vehicle occupant protection device that is inflatable away from the vehicle roof into a position between the side structure of the vehicle and a vehicle occupant. The inflatable vehicle occupant protection device includes an inflatable main portion having a plurality of inflatable primary chambers and an inflatable secondary chamber. Each primary chamber has an inflation fluid inlet and a plurality of inflation fluid outlets. An inflatable front portion is positioned forward of the main portion. The front portion includes a forward edge, a rear edge, and a bottom edge. The front portion is in fluid communication with the main portion via an inflation fluid passage positioned near the bottom edge of the front portion. An inflation fluid source is actuatable to provide inflation fluid for inflating the inflatable vehicle occupant protection device. The inflation fluid source, when actuated, directs inflation fluid into the main portion to inflate the main portion. The inflation fluid inlet of each primary chamber directs inflation fluid from the inflation fluid source into the primary chamber. The inflation fluid outlets of each primary chamber direct inflation fluid from the primary chamber into the secondary chamber to inflate the secondary chamber. The inflation fluid passage directs inflation fluid from the secondary chamber to the front portion to inflate the front portion. The inflation fluid outlets are sized to maintain a predetermined inflation fluid pressure within the primary chambers while the secondary chamber inflates.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a sectional view of the apparatus taken generally along line 3-3 in FIG. 2;

DESCRIPTION OF PREFERRED EMBODIMENTS

Figure 1:
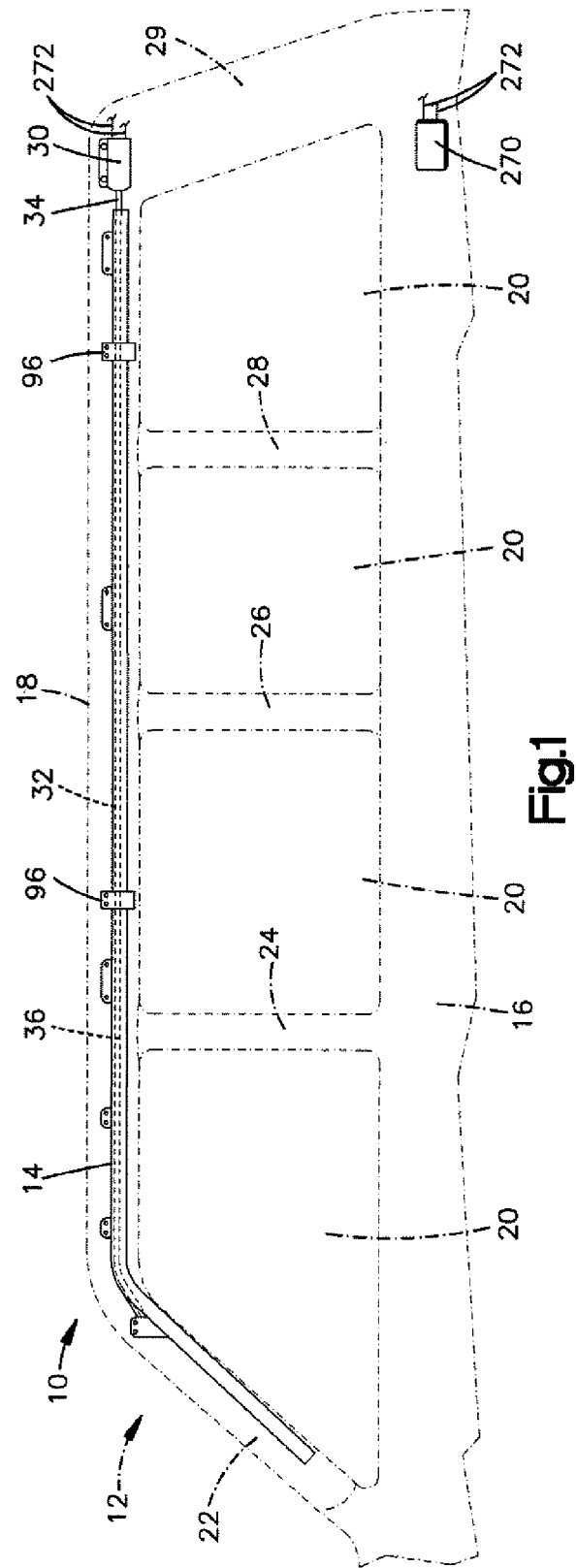
FIG. 1 is a schematic view illustrating an apparatus for helping to protect a vehicle occupant in a deflated condition, according to an embodiment of the present invention.
Figure 2:
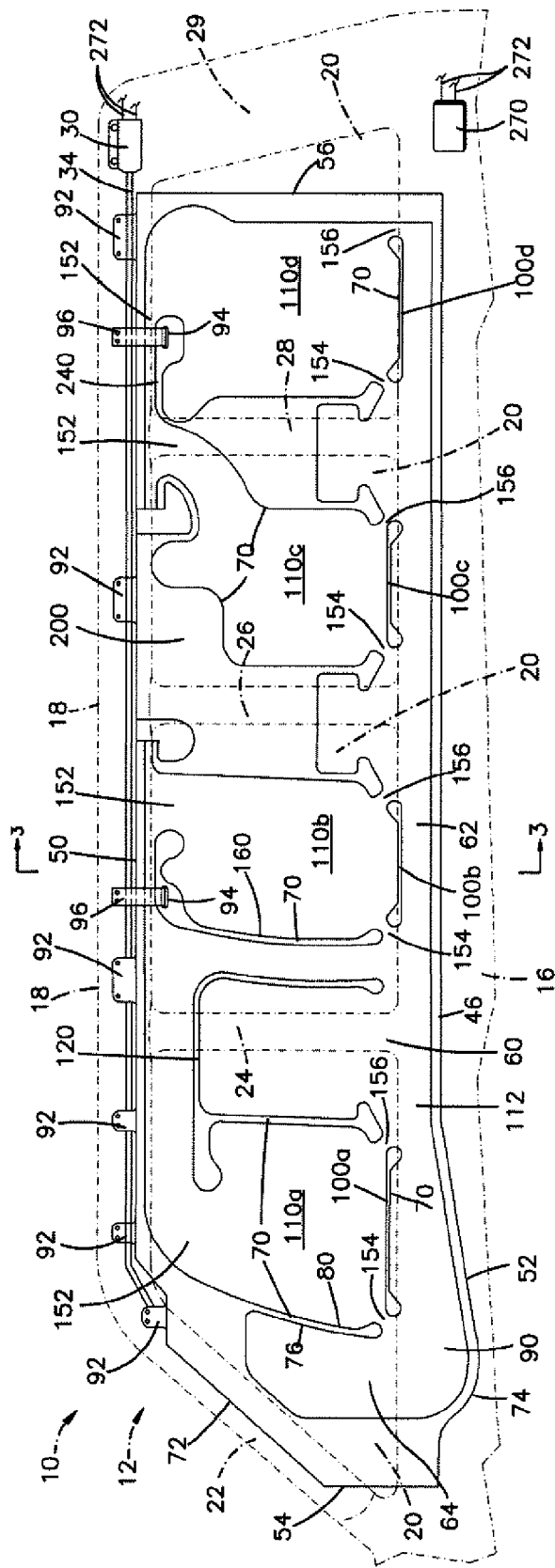
FIG. 2 is a schematic view of the apparatus of FIG. 1 in an inflated condition.

As representative of the present invention, an apparatus 10 helps to protect an occupant of a vehicle 12. The vehicle 12 may constitute, for example, a multi-row vehicle such as a van, bus or sport utility vehicle having three or more seating rows. As shown in FIGS. 1 and 2, the apparatus 10 includes an inflatable vehicle occupant protection device in the form of an inflatable curtain 14 that is mounted near the side structure 16 of the vehicle 12 and a roof 18 of the vehicle. The roof 18 may be either a standard roof that is fixed in place or a convertible roof that can be moved or removed.

The side structure 16 of the vehicle 12 includes side windows 20, an A pillar 22, a B pillar 24, a C pillar 26, a D pillar 28, and an E pillar 29. Although the vehicle 12 illustrated in FIGS. 1 and 2 includes four rows of occupant seating between adjacent pairs of pillars 22, 24, 26, 28, 29, the vehicle could likewise include more or less rows of occupant seating and, thus, may include more or less pillars (not shown). An inflator 30 is connected in fluid communication with the inflatable curtain 14 through a fill tube 32.

The fill tube 32 has a first end portion 34 for receiving fluid from the inflator 30. The fill tube 32 has a second end portion 36 disposed in the inflatable curtain 14. The second end portion 36 of the fill tube 32 has a plurality of openings (not shown) that provide fluid communication between the fill tube 32 and the inflatable curtain 14.

The inflator 30 contains a stored quantity of pressurized inflation fluid (not shown) in the form of a gas for inflating the inflatable curtain 14. The inflator 30 alternatively could contain a combination of pressurized inflation fluid and ignitable material for heating the inflation fluid, or could be a pyrotechnic inflator that uses the combustion of gas-generating material to generate inflation fluid. As a further alternative, the inflator 30 could be of any suitable type or construction for supplying a medium for inflating the inflatable curtain 14.

The apparatus 10 has a stored condition in which the inflatable curtain 14 is stored in a deflated condition. This is illustrated in FIG. 1. When the apparatus 10 is in the stored condition, the deflated inflatable curtain 14 has an elongated configuration and extends along the vehicle roof 18 and along the side structure 16 of the vehicle 12 above the side windows 20. A portion of the apparatus 10 of FIG. 1 extends along the A pillar 22 of the vehicle 12 when the apparatus is in the stored position. The apparatus 10 may include a housing (not shown) that houses the inflatable curtain 14 in the stored condition.

Referring to FIG. 3, the inflatable curtain 14 comprises first and second panels 40 and 42 that are arranged in an overlying manner. The first and second panels 40 and 42 are interconnected to form a perimeter connection 46 (FIGS. 2 and 3) that extends along a perimeter 48 of the panels. The first and second panels 40 and 42 are also interconnected to form connections 70 within the perimeter 48 of the inflatable curtain 14.

In one construction of the inflatable curtain 14, the perimeter connection 46 and the connections 70 are formed by weaving the panels 40 and 42 together. In an alternative construction of the inflatable curtain 14, means such as stitching, dielectric sealing, ultrasonic bonding, heat sealing, and adhesives may be used to interconnect the first and second panels 40 and 42 in order to form the perimeter connection 46 and the connections 70.

In one construction of the inflatable curtain 14, the curtain is formed by weaving the first and second panels 40 and 42 simultaneously while also interweaving the perimeter connection 46 and the connections 70 as single layers of fabric. This can be accomplished, for example, by using a Jacquard or Dobby weaving machine. The weaving machines are preprogrammed to weave the first and second panels 40 and 42 along with the perimeter connection 46 and connections 70 at the same time. No intermediate steps are required.

In another construction of the inflatable curtain 14, the curtain may be formed by interconnecting two separate fabric pieces together along the perimeter connection 46 and the connections 70. In a further construction, a single piece of fabric may be folded over to form the overlying first and second panels 40 and 42. In this instance, the fold is part of the perimeter connection 46 of the inflatable curtain 14.

The inflatable curtain 14 can be constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The first and second panels 40 and 42, the perimeter connection 46, and the connections 70 may be coated using a laminate film, slurry, and/or a spray coating, such as silicone, urethane, or other known suitable materials, in order to achieve a substantially gas-tight construction. This helps to prevent gas from permeating directly through the first and second panels 40 and 42, the perimeter connection 46, and the connections 70.

The perimeter 48 (FIG. 2) of the inflatable curtain 14 is defined by upper and lower edges 50 and 52, respectively, of the curtain and front and rear edges 54 and 56, respectively, of the curtain that are spaced apart horizontally along the upper and lower edges. The upper edge 50 of the inflatable curtain 14 includes at least one integrally formed fastening device 92 to help secure the curtain to the vehicle 12. The perimeter connection 46 (FIG. 2) defines an inflatable volume 60 of the inflatable curtain 14.

Figure 4A:
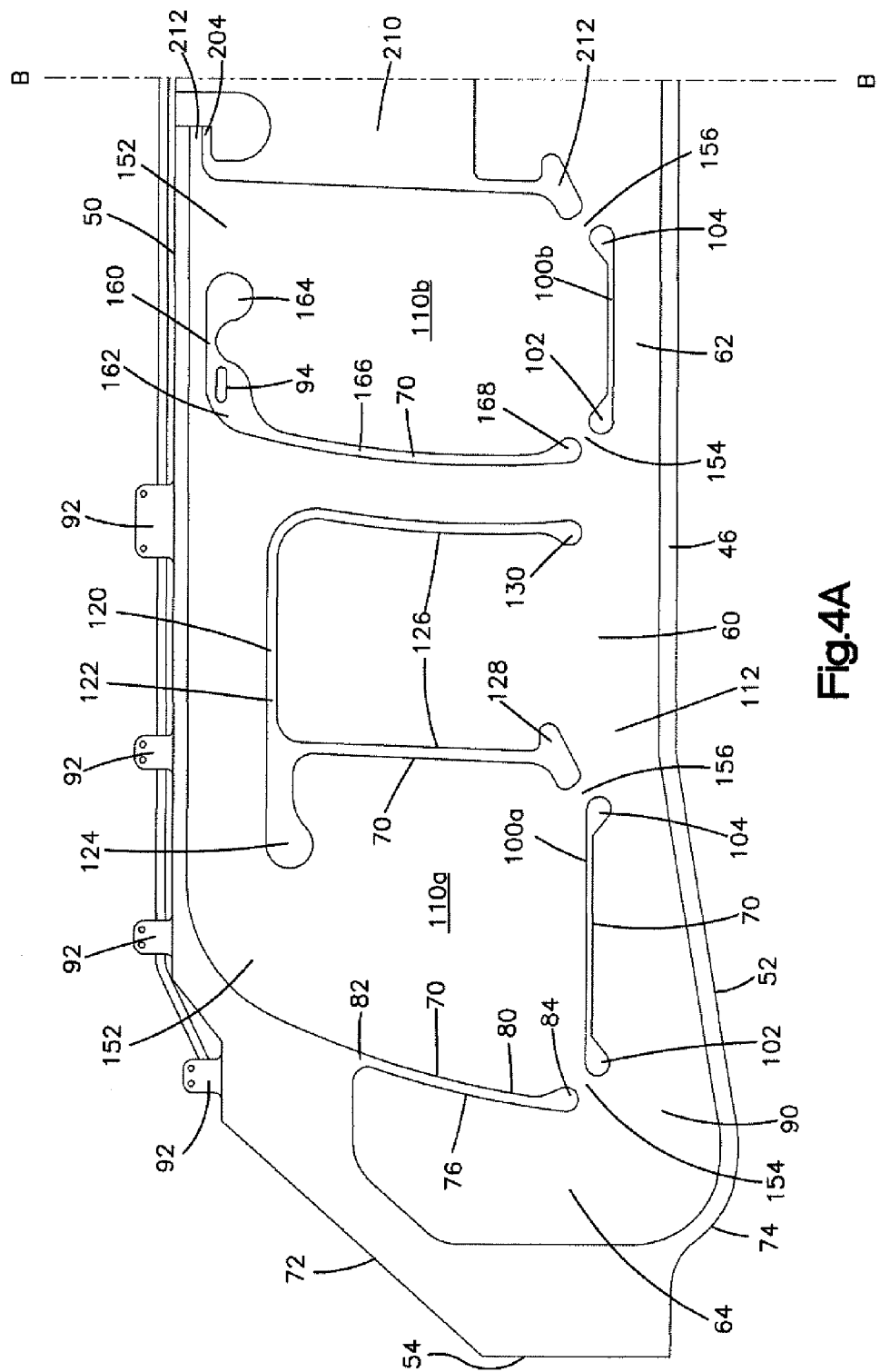
FIGS. 4A-4B are schematic views of a portion of the apparatus of FIG. 2.
Figure 4B:
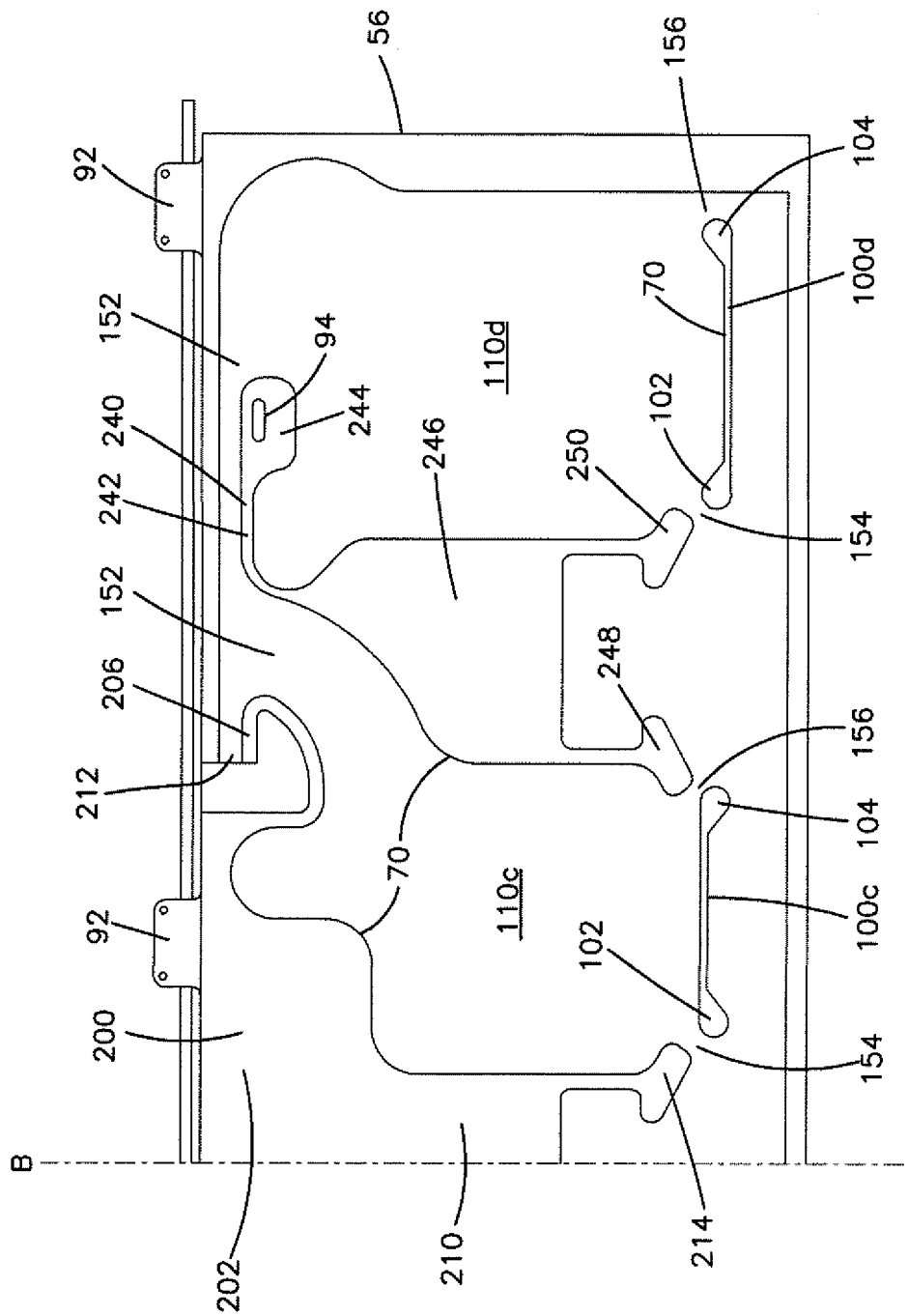

Referring to FIGS. 4A-4B, the inflatable curtain 14 includes an inflatable main portion 62 partially defined by the upper edge 50, lower edge 52, and rear edge 56 of the curtain. The main portion 62 extends from the upper edge 50 to the lower edge 52. The main portion 62 is further defined by one of the connections 70, namely, a front connection 80 of the inflatable curtain 14. The front connection 80 has a first end 82 that intersects the perimeter connection 46 near the upper edge 50 of the inflatable curtain 14. The front connection 80 extends in a generally vertical direction from the upper edge 50 of the inflatable curtain 14 towards the lower edge 52 of the curtain. The front connection 80 has an enlarged second end 84, opposite the first end 82, spaced from the perimeter connection 46 and positioned near the lower edge 52.

The inflatable curtain 14 also includes an inflatable front portion 64 partially defined by the upper edge 50, lower edge 52, front edge 54, and front connection 80. The front portion 64 has a generally rectangular configuration. As illustrated in FIG. 2, the upper and lower edges 50 and 52 have portions that extend at an angle towards each other in the front portion 64 of the inflatable curtain 14. The angled portion of the upper edge 50 forms a forward edge 72 of the front portion 64. The lower edge 52 forms a bottom edge 74 of the front portion 64. The front connection 80 forms a rear edge 76 of the front portion 64. The front edge 54 of the inflatable curtain 14 extends a relatively short distance between terminal ends of the upper and lower edges 50 and 52, i.e., between the forward edge 72 and bottom edge 74 of the front portion 64. The front edge 54 could, however, be omitted and the upper and lower edges 50 and 52 could be extended until they intersect, in which case the front portion 64 would be partially defined by the intersecting upper and lower edges.

The enlarged second end 84 (FIG. 4A) of the front connection 80 extends in a generally vertical direction as viewed in FIG. 4A and is spaced from the perimeter connection 46. An inflation fluid passage 90 is defined between the second end 84 and the portion of the perimeter connection 46 extending along the lower edge 52 near the second end. The inflation fluid passage 90 provides fluid communication between the main portion 62 and the front portion 64. In an alternative embodiment (not shown), the front connection 80 and inflation fluid passage 90 are omitted. In this instance, the main portion 62 would be the forwardmost inflatable portion of the inflatable curtain 14.

The main portion 62 (FIGS. 4A-4B) of the inflatable curtain 14 includes a plurality of the connections 70, namely, four middle connections 120, 160, 200, 240 and four bottom connections 100*a-d* for helping to define four primary inflatable chambers 110*a-d* located in the main portion 62 of the curtain. The primary chambers 110*a-d* are generally rectangular and, as viewed in FIGS. 4A-4B, extend generally downward from near the upper edge 50 of the inflatable curtain 14 toward the lower edge 52 of the curtain. Each of the primary chambers 110*a-d* includes an inflation fluid inlet 152 positioned near the upper edge 50 of the inflatable curtain 14 and a pair of inflation fluid outlets 154, 156 positioned near the lower edge 52 of the inflatable curtain. It will be appreciated, however, that more inflation fluid inlets 152 and/or more or fewer inflation fluid outlets 154, 156 may be provided for each primary chamber 110*a-d*. It will also be appreciated that more or fewer primary chambers 110*a-d* than the four primary chambers illustrated may be provided in the inflatable curtain 14. The number of primary chambers 110*a-d* may correspond with the number of seating rows in the vehicle 12.

The middle connection 120 includes an upper portion 122 and a pair of lower portions 126. The upper portion 122 is positioned near the upper edge 50 of the inflatable curtain 14 and extends in a generally horizontal direction, as viewed in FIG. 4A. The upper portion 122 terminates at an end 124 spaced from the front edge 54 and upper edge 50 of the inflatable curtain 14. The end 124 cooperates with a portion of the perimeter connection 46 along the front edge 52 to define the inflation fluid inlet 152 of the primary chamber 110a. The lower portions 126 extend from the upper portion 122 in a generally vertical direction towards the lower edge 52 of the inflatable curtain 14. The lower portions 126 terminate at enlarged first and second ends 128, 130 spaced from one another and from the lower edge 52 of the inflatable curtain 14.

The bottom connection 100a is positioned near and spaced from the bottom edge 52 of the inflatable curtain 14. The bottom connection 100a extends in a generally horizontal direction between enlarged first and second ends 102, 104. The first end 102 is positioned near and spaced from the second end 84 of the front connection 80. The second end 104 is positioned near and spaced from the end 128 of the middle connection 120. The first end 102 of the bottom connection 100a and the second end 84 of the front connection 80 cooperate to define the inflation fluid outlet 154 of the primary chamber 110a. The second end 104 of the bottom connection 100a and the end 128 of the middle connection 120 cooperate to define the inflation fluid outlet 156 of the primary chamber 110a.

In the instance where the front connection 80 and front chamber 64 are omitted, the bottom connection 100a cooperates with the portion of the perimeter connection 46 along the front edge 54 to define the inflation fluid outlet 154 of the primary chamber 110a.

The middle connection 160 includes an upper portion 162 and a lower portion 166. The upper portion 162 is positioned near and spaced from the upper edge 50 of the inflatable curtain 14 and extends in a generally horizontal direction, as viewed in FIG. 4A. The upper portion 162 terminates at an enlarged end 164 spaced from the front edge 54 of the inflatable curtain 14. The upper portion 162 may include an aperture 94 for receiving a fastening device 96 to help secure the inflatable curtain 14 to the vehicle 12. The lower portion 166 extends from the upper portion 162 in a generally vertical direction towards the lower edge 52 of the inflatable curtain 14. The lower portion 166 terminates at an enlarged end 168 spaced from the lower edge 52 of the inflatable curtain 14.

The middle connection 200 includes an upper portion 202 and a lower portion 210. The upper portion 202 is positioned near and spaced from the upper edge 50 of the inflatable curtain 14 and extends in a generally horizontal direction. The upper portion 202 includes a first end 204 and a second end 206 and cooperates with the end 164 of the middle connection 160 to define the inflation fluid inlet 152 of the primary chamber 110b. The lower portion 210 extends from the upper portion 202 in a generally vertical direction towards the lower edge 52 of the inflatable curtain 14. The lower portion 210 terminates at enlarged first and second ends 212, 214 spaced from one another and from the lower edge 52 of the inflatable curtain 14.

The bottom connection 100b positioned near and spaced from the bottom edge 52 of the inflatable curtain 14 extends in a generally horizontal direction between enlarged first and second ends 102, 104. The first end 102 is positioned near and spaced from the end 168 of the middle connection 160. The second end 104 is positioned near and spaced from the end 212 of the middle connection 200. The first end 102 of the bottom connection 100b and the end 168 of the middle connection 160 cooperate to define the inflation fluid outlet 154 of the primary chamber 110b. The second end 104 of the bottom connection 100b and the end 212 of the middle connection 200 cooperate to define the inflation fluid outlet 156 of the primary chamber 110b.

The middle connection 240 includes an upper portion 242 and a lower portion 246. The upper portion 242 is positioned near and spaced from the upper edge 50 of the inflatable curtain 14 and extends in a generally horizontal direction. The upper portion 242 includes an enlarged end 244 that cooperates with the upper edge 50 of the inflatable curtain 14 to define the inflation fluid inlet 152 of the primary chamber 110c. The upper portion 242 may include an aperture 94 for receiving a fastening device 96 to help secure the inflatable curtain 14 to the vehicle 12.

The lower portion 246 extends from the upper portion 242 in a generally vertical direction towards the lower edge 52 of the inflatable curtain 14. The lower portion 246 terminates at enlarged first and second ends 248, 250 spaced from one another and from the lower edge 52 of the inflatable curtain 14. The bottom connection 100c positioned near the bottom edge 52 of the inflatable curtain 14 extends in a generally horizontal direction between enlarged first and second ends 102, 104. The first end 102 is positioned near and spaced from the end 214 of the middle connection 200. The second end 104 is positioned near and spaced from the end 248 of the middle connection 240. The first end 102 of the bottom connection 100c and the end 214 of the middle connection 200 cooperate to define the inflation fluid outlet 154 of the primary chamber 110c. The second end 104 of the bottom connection 100c and the end 248 of the middle connection 240 cooperate to define the inflation fluid outlet 156 of the primary chamber 110c.

The bottom connection 100d positioned near and spaced from the bottom edge 52 of the inflatable curtain 14 extends in a generally horizontal direction between enlarged first and second ends 102, 104. The first end 102 is positioned near and spaced from the end 250 of the middle connection 240. The second end 104 is positioned near and spaced from the rear edge 56 of the inflatable curtain 14. The first end 102 of the bottom connection 100d and the end 250 of the middle connection 240 cooperate to define the inflation fluid outlet 154 of the primary chamber 110d. The second end 104 of the bottom connection 100d and the portion of the perimeter connection 46 near the rear edge 56 of the inflatable curtain 14 cooperate to define the inflation fluid outlet 156 of the primary chamber 110d.

It will be appreciated that the inflation fluid outlets 154, 156 may have the same size or different sizes for each primary chamber 110a-d. Likewise, the inflation fluid outlets 154, 156 for one primary chamber 110a-d may have the same size or different sizes from the inflation fluid outlet for every other primary chamber. The size of the inflation fluid outlets 154, 156 may therefore be adjusted to meet desired performance criterion. Along the same lines, the inflation fluid inlets 152 may have the same size or may have different sizes for each primary chamber 110a-d to meet desired performance criterion.

The inflatable curtain 14 also includes a bottom or secondary chamber 112 that extends along the lower edge 52 in the main portion 62 of the curtain. The bottom chamber 112 is defined between the bottom connections 100a-d and the portion of the perimeter connection 46 along the bottom edge 52 of the inflatable curtain 14. The bottom chamber 112 is in fluid communication with the front chamber 64 via the inflation fluid passage 90. The bottom chamber 112 is in fluid communication with each primary chamber 110a-d via the inflation fluid outlets 154, 156 of each primary chamber.

The inflatable curtain 14 further includes a passage 212 for receiving the fill tube 32. The passage 212 is defined between the portion of the perimeter connection 46 along the upper edge 50 of the inflatable curtain 14 and the ends 204, 206 of the middle connection 200. The passage 212 receives the fill tube 32 when the fill tube is inserted into the inflatable curtain 14. When the fill tube 32 is fully inserted in the inflatable curtain 14, the portions of the curtain that define the passage 212 encircle the fill tube 32 and form a snug fit with the fill tube. The passage 212 thus helps to position the fill tube 32 in the inflatable curtain 14 and helps to maintain the position of the fill tube relative to the curtain.

The upper portion 162 of the middle connection 160 and the upper portion 242 of the middle connection 240 are spaced from the upper edge 50 of the inflatable curtain 14 a distance slightly larger than the diameter of the fill tube 32. The upper portions 162, 242 thus help guide the fill tube 32 into the inflatable curtain 14 when the tube is inserted into the curtain. The upper portions 162, 242 also help to position the fill tube 32 in the inflatable curtain 14 and help to maintain the position of the fill tube relative to the curtain.

The vehicle 12 includes a sensor mechanism 270 (shown schematically in FIGS. 1 and 2) for sensing a side impact to the vehicle 12 and/or a rollover of the vehicle 12. The sensor mechanism 270 actuates the inflator 30 in response to the sensing of a side impact or a vehicle rollover. In the event of a rollover of the vehicle 12 or a side impact to the vehicle for which actuation of the curtain 14 is desired to help protect a vehicle occupant, the sensor mechanism 270 provides an electrical signal over lead wires 272 to the inflator 30. The electrical signal from the sensor mechanism 270 causes the inflator 30 to be actuated in a known manner. The inflator 30 discharges fluid under pressure into the fill tube 32. The fill tube 32 directs the fluid into the main portion 62 of the inflatable curtain 14.

The inflatable curtain 14 inflates under the pressure of the inflation fluid from the inflator 30. The inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 (FIG. 3) is positioned near the side structure 16 of the vehicle 12. The upper edge 50 (FIG. 2) of the inflatable curtain 14 is positioned near the intersection of the roof 18 and the side structure 16 of the vehicle 12. The front edge 54 of the inflatable curtain 14 is positioned near the A pillar 22 of the vehicle 12. The rear edge 56 of the inflatable curtain 14 is positioned near the E pillar 29 of the vehicle 12. The inflatable curtain 14 extends between the A pillar 22 and the E pillar 29 of the vehicle 12 and may overlie portions of the A pillar, B pillar 24, C pillar 26, D pillar 28, and E pillar 29 of the vehicle.

It will be recognized by those skilled in the art that the inflatable curtain 14 may have alternative configurations. For example, in the illustrated embodiment, the inflatable curtain 14 extends between the A pillar 22 and the E pillar 29 of the vehicle 12. The inflatable curtain 14 could, however, extend between the A pillar 22 and the B pillar 24 only or between the B pillar and the E pillar 29 only. Also, the inflatable curtain 14 could extend between the A pillar 22 and the D pillar 28 of the vehicle 12.

Referring to FIGS. 4A-4B, the inflatable curtain 14, when inflated, helps to protect a vehicle occupant in the event of a vehicle rollover or a side impact to the vehicle 12. The connections 80, 100, 120, 160, 200, 240 help to limit the thickness of the inflated inflatable curtain 14 and help reduce the overall volume of the curtain. The front chamber 64, primary chambers 110a-110d, and secondary chamber 112 of the main portion 62, when inflated, help to absorb the energy of impacts by any occupants with the inflatable curtain 14 and help to distribute the impact energy from any occupants over a large area of the curtain.

As the inflatable curtain 14 is inflated, inflation fluid is directed from the fill tube 32 into the main portion 62 of the curtain. The inflation fluid is initially directed into the primary chambers 110a-110d through the inflation fluid inlets 152. The inflation fluid inflates the primary chambers 110a-110d, flows downward within the primary chambers towards the lower edge 52, and then exits the primary chambers through the inflation fluid outlets 154, 156. When the inflation fluid exits the primary chambers 110a-110d, the inflation fluid is directed by the inflation fluid outlets 154, 156 into the secondary chamber 112.

Inflation fluid is also directed from the secondary chamber 112 into the front portion 64 via the inflation fluid passage 90. Inflation fluid may also flow directly from the inflation fluid outlet 154 of the primary chamber 110a into the front portion 64 via the inflation fluid passage 90. In any case, the inflation fluid enters the front portion 64 and inflates the chamber of the front portion.

In the embodiment illustrated in FIGS. 1-4, the front portion 64 and secondary chamber 112 begin to inflate after the primary chambers 110a-110d begin to inflate. The rate at which the front portion 64 inflates depends upon the size of the inflation fluid passage 90, i.e., the distance between the second end 84 of the front connection 80 and the portion of the perimeter connection 46 near the lower edge 52. The front portion 64 may thus be inflated at a desired rate by adjusting the first inflation fluid passage 90 to an appropriate size. Accordingly, the connection 80 may be configured such that the main portion 62 is substantially inflated before the front portion 64 is inflated.

As the main portion 62 is inflated, the primary chambers 110a-110d begin to inflate before the secondary chamber 112 begins to inflate. The rate at which the primary chambers 110a-110d inflate depends upon the size of the inflation fluid inlets 152. Accordingly, the connections 120, 160, 200, 240 and perimeter connection 46 may be configured such that the primary chambers 110a-110d are substantially inflated before the secondary chamber 112 begins to inflate.

The rate at which the secondary chamber 112 inflates depends upon the size of the inflation fluid outlets 154 and 156, i.e., the distance between each end 102, 104 of the respective bottom connection 100a-d and the corresponding bottom portion of the connection 80, 120, 160, 200, 240 or portion of the perimeter connection 46. The pressure maintained in the primary chambers 110a-110d while the secondary chamber 112 inflates is likewise controlled by the size of the inflation fluid outlets 154, 156. Based on the aforementioned construction, the present invention advantageously can fulfill certain government safety requirements, such as National Highway Traffic Safety Administration Federal Motor Vehicle Safety Standards FMVSS-201 and 214 for Cushioning requirements and the FMVSS-226 Ejection Mitigation requirement.

Figure 5:
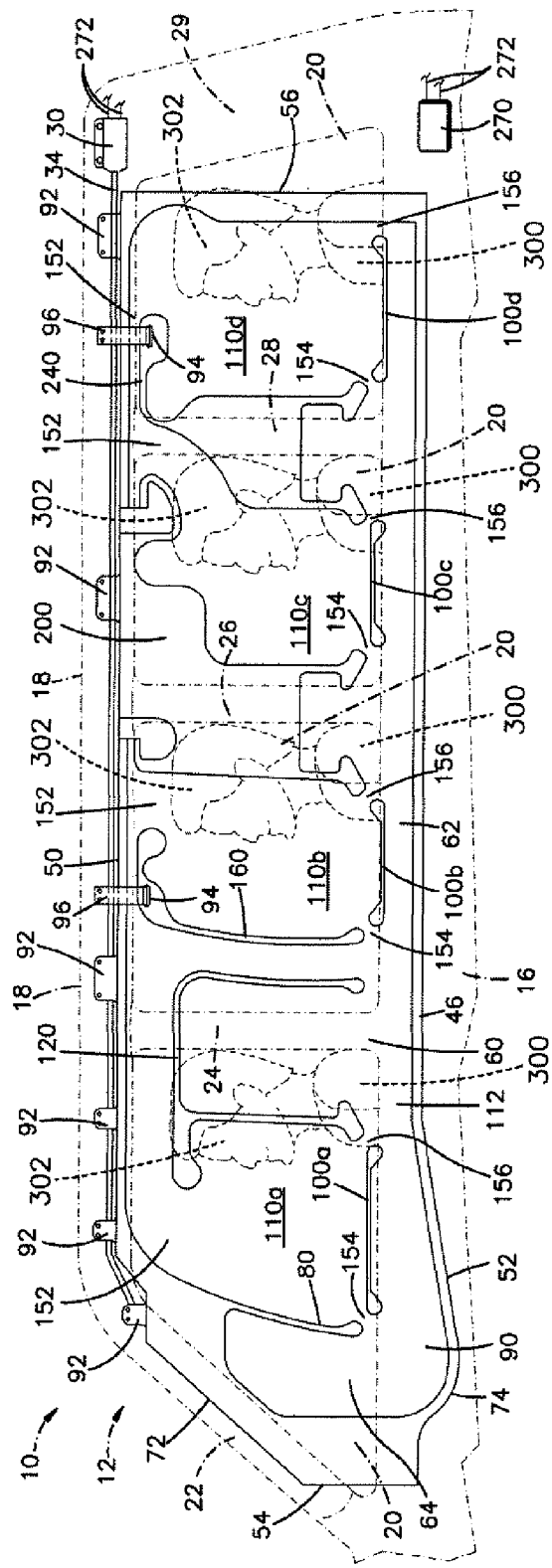
FIG. 5 is a schematic view of the apparatus of FIG. 2 in a first condition.
Figure 6:
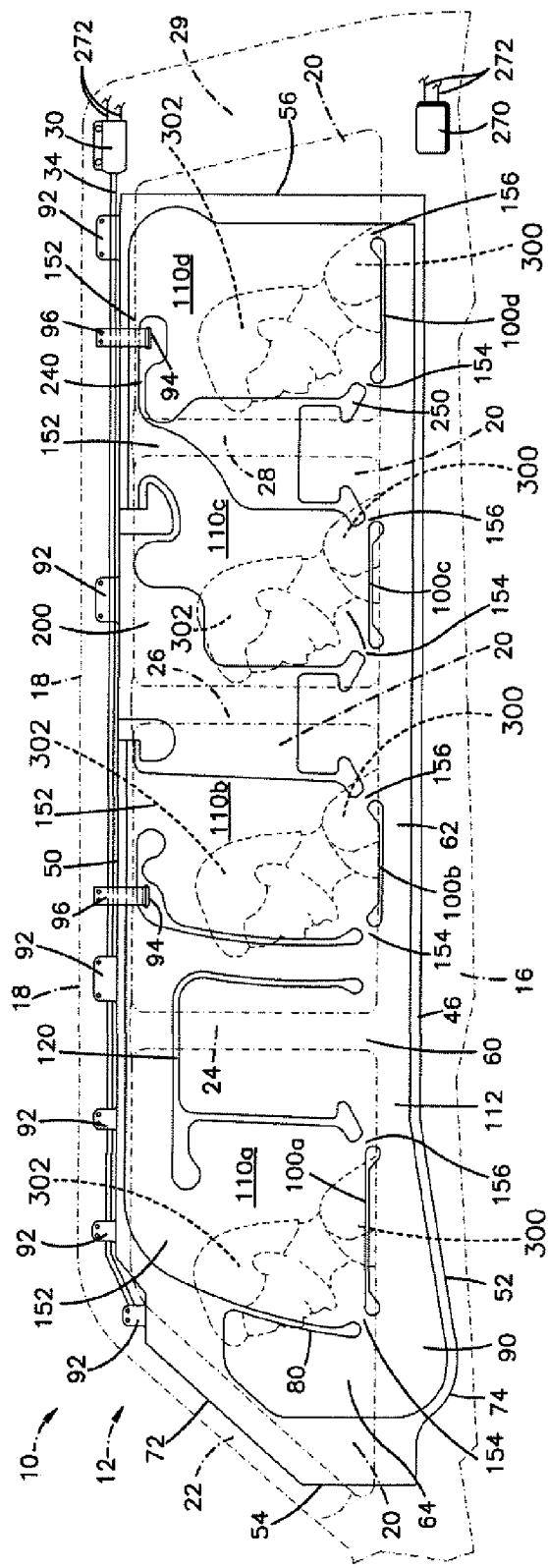
FIG. 6 is a schematic view of the apparatus of FIG. 2 in a second condition.

One exemplary operation of the apparatus 10 in accordance with the present invention and with the aforementioned safety requirements in mind is illustrated in FIGS. 5 and 6. As shown in FIG. 5, within about 1.5 seconds of deployment of the inflatable curtain 14, occupants 300 in the vehicle 12 are expected to be in a first position relative to the side structure 16, e.g., a position in which heads 302 of the occupants are nearer the upper edge 50 of the curtain and substantially aligned with the primary chambers 110a-d. The primary chambers 110a-d, being the first portions of the inflatable curtain 14 to inflate, therefore help mitigate impact forces between the heads 302 of the occupants 300 and the side structure 16 of the vehicle 12 immediately following deployment of the curtain. Accordingly, the inflation fluid inlets 152 and inflation fluid outlets 154, 156 are configured to ensure that pressure within the primary chambers 110a-d is maintained above a predetermined amount immediately following deployment of the inflatable curtain 14, i.e., within about the first 1.5 seconds following deployment.

Referring to FIG. 6, after about 6.0 seconds of deployment of the inflatable curtain 14, the occupants 300 in the vehicle 12 are expected to be in a second position different from the first position. For instance, in the second position the heads 302 of the occupants are positioned nearer the lower edge 52 of the curtain and substantially aligned with the secondary chamber 112 and front chamber 64 at a location more forward within the vehicle relative to the first position. By this time, the second chamber 112 is inflated via the inflation fluid outlets 154, 156 and the front chamber 64 is inflated via the inflation fluid passage 90. The now inflated secondary chamber 112 and front chamber 64 help mitigate impact forces between the occupants 300 and the side structure 16 of the vehicle shortly after deployment of the inflatable curtain 14.

In order to meet certain government safety standards, the inflation fluid outlets 154, 156 may be configured to ensure that inflation fluid flow from the primary chambers 110a-d to the secondary chamber 112 maintains fluid pressure within the primary chambers 110a-d above a predetermined amount beyond 6.0 seconds after deployment of the inflatable curtain 14 while simultaneously pressurizing the secondary chamber and front chamber 64 above a predetermined amount. Such a configuration advantageously ensures that the primary chambers 110a-d continue to help mitigate impact forces between the heads 302 of the occupants 300 and the side structure 16 shortly after deployment of the inflatable curtain 14.

From the above description of the invention, those skilled in the art will perceive improvements, changes and modifications. For example, the front chamber, primary chambers, and bottom chamber of the inflatable curtain in the embodiment may be defined by connections having shapes and configurations different than the connections illustrated in the respective embodiments. As a further example, in the illustrated embodiment, the protection device includes a single inflatable curtain with a single inflator that extends between the A pillar and E pillar. The protection device could, however, includes multiple inflatable curtains inflated by separate inflators to collectively extend between the A pillar and E pillar. Such improvements, changes and modifications within the skill of the art are intended to be covered by the appended claims.

Having described the invention, the following is claimed:

1. Apparatus for helping to protect an occupant of a vehicle that has a side structure and a roof, the apparatus comprising:
an inflatable vehicle occupant protection device that is inflatable away from the vehicle roof into a position between the side structure of the vehicle and a vehicle occupant, the inflatable vehicle occupant protection device comprising an inflatable main portion having at least one inflatable primary chamber and an inflatable secondary chamber, each primary chamber having an inflation fluid inlet and a plurality of inflation fluid outlets; and an inflation fluid source that is actuatable to provide inflation fluid for inflating the inflatable vehicle occupant protection device, the inflation fluid source, when actuated, directing inflation fluid into the main portion to inflate the main portion, the inflation fluid inlet of each primary chamber directing inflation fluid from the inflation fluid source into the primary chamber, the inflation fluid outlets of each primary chamber directing inflation fluid from the primary chamber into the secondary chamber to inflate the secondary chamber.

2. Apparatus as recited in claim 1, further comprising an inflatable front portion positioned forward of the main portion, the front portion including a forward edge, a rear edge, and a bottom edge, the front portion being in fluid communication with the main portion via an inflation fluid passage positioned near the bottom edge of the front portion such that the inflation fluid passage directs inflation fluid from the main portion into the front portion to inflate the front portion.

3. Apparatus as recited in claim 2, wherein the main portion begins to inflate before the front portion begins to inflate.

4. Apparatus as recited in claim 2, wherein the main portion is substantially inflated before the front portion begins to inflate.

5. Apparatus as recited in claim 2, wherein the inflatable vehicle occupant protection device comprises overlying panels interconnected to form a perimeter connection extending along a perimeter of the inflatable vehicle occupant protection device, the perimeter being at least partially defined by upper and lower edges of the inflatable vehicle occupant protection device, the inflatable vehicle occupant protection device including at least connection having a front connection interconnecting the overlying panels, the front connection having a first end intersecting the perimeter connection near the upper edge of the inflatable vehicle occupant protection device and an opposite second end spaced from the perimeter connection near the lower edge of the inflatable vehicle occupant protection device, the front portion being positioned forward of the front connection, the main portion being positioned rearward of the front connection.

6. Apparatus as recited in claim 5, wherein the inflation fluid passage is defined between the second end of the front connection and the lower edge of the inflatable vehicle occupant protection device.

7. Apparatus as recited in claim 5, wherein the inflatable vehicle occupant protection device includes at least one connection interconnecting the overlying panels within the main portion for helping to define the at least one primary chamber and the secondary chamber, each inflation fluid inlet being positioned near the upper edge of the inflatable vehicle occupant protection device and each inflation fluid outlet being positioned near the lower edge of the inflatable vehicle occupant protection device.

8. Apparatus as recited in claim 7, wherein the at least one connection includes a middle connection and a bottom connection interconnecting the overlying panels within the main portion and cooperating with the front connection to define one primary chamber, the middle connection being spaced from the upper edge of the inflatable vehicle occupant protection device and cooperating with the perimeter of the inflatable vehicle occupant protection device to define the inflation fluid inlet for the primary chamber, the bottom connection being spaced from the middle connection and the front connection to define the inflation fluid outlets of the primary chamber.

9. Apparatus as recited in claim 8, wherein the bottom connection and middle connection cooperate with the lower edge of the inflatable vehicle occupant protection device to define the secondary chamber.

10. Apparatus as recited in claim 5, wherein the at least one connection includes a plurality of middle connections and a plurality of bottom connections interconnecting the overlying panels within the main portion to help define a plurality of primary chambers, the middle connections and bottom connections cooperating with the lower edge of the inflatable vehicle occupant protection device to define the secondary chamber.

11. Apparatus as recited in claim 1, wherein the inflatable vehicle occupant protection device comprises overlying panels interconnected to form a perimeter connection extending along a perimeter of the inflatable vehicle occupant protection device, the perimeter being at least partially defined by upper and lower edges of the inflatable vehicle occupant protection device, at least one middle connection and at least one bottom connection interconnecting the overlying panels within the main portion for helping to define the at least one primary chamber and the secondary chamber, each inflation fluid inlet being positioned near the upper edge of the inflatable vehicle occupant protection device and each inflation fluid outlet being positioned near the lower edge of the inflatable vehicle occupant protection device.

12. Apparatus as recited in claim 11, wherein one of the at least one middle connection is spaced from the upper edge of the inflatable vehicle occupant protection device and cooperates with the perimeter of the inflatable vehicle occupant protection device to define the inflation fluid inlet for the primary chamber, the bottom connection being spaced from the middle connection and the perimeter to define the inflation fluid outlets of the primary chamber.

13. Apparatus as recited in claim 1, wherein the inflatable vehicle occupant protection device, when inflated, extends along the side structure of the vehicle between an A pillar and a E pillar of the vehicle.

14. Apparatus as recited in claim 1, wherein the inflatable vehicle occupant protection device, when inflated, overlies at least a portion of an A pillar, a B pillar, a C pillar, a D pillar, and an E pillar of the vehicle.

15. Apparatus as recited in claim 1, wherein the inflatable vehicle occupant protection device is an inflatable curtain having a stored position extending along the side structure near a roof of the vehicle.

16. Apparatus as recited in claim 15, further including a fill tube in fluid communication with the main portion of the inflatable vehicle occupant protection device, the inflation fluid source being in fluid communication with the fill tube, the inflation fluid source, when actuated, providing inflation fluid to the fill tube, the fill tube directing the inflation fluid into the main portion of the inflatable vehicle occupant protection device to inflate the inflatable vehicle occupant protection device.

17. Apparatus as recited in claim 1, wherein the inflation fluid outlets are sized to maintain a predetermined inflation fluid pressure within the at least one primary chamber while the secondary chamber inflates.

18. Apparatus for helping to protect an occupant of a vehicle that has a side structure and a roof, the apparatus comprising:

an inflatable vehicle occupant protection device that is inflatable away from the vehicle roof into a position between the side structure of the vehicle and a vehicle occupant, the inflatable vehicle occupant protection device comprising an inflatable main portion having a plurality of inflatable primary chambers and an inflatable secondary chamber, each primary chamber having an inflation fluid inlet and a plurality of inflation fluid outlets;

an inflatable front portion positioned forward of the main portion, the front portion including a forward edge, a rear edge, and a bottom edge, the front portion being in fluid communication with the main portion via an inflation fluid passage positioned near the bottom edge of the front portion; and an inflation fluid source that is actuatable to provide inflation fluid for inflating the inflatable vehicle occupant protection device, the inflation fluid source, when actuated, directing inflation fluid into the main portion to inflate the main portion, the inflation fluid inlet of each primary chamber directing inflation fluid from the inflation fluid source into the primary chamber, the inflation fluid outlets of each primary chamber directing inflation fluid from the primary chamber into the secondary chamber to inflate the secondary chamber, the inflation fluid passage directing inflation fluid from the secondary chamber to the front portion to inflate the front portion, the inflation fluid outlets being sized to maintain a predetermined inflation fluid pressure within the primary chambers while the secondary chamber inflates.

\* \* \* \* \*